United States Patent
Bostick et al.

(10) Patent No.: US 7,905,516 B2
(45) Date of Patent: Mar. 15, 2011

(54) AIRBAG MODULE WITH INTEGRATED GAS GENERATION

(75) Inventors: William E. Bostick, St. Clair, MI (US); James P. Karlow, Commerce Township, MI (US); Dave McCormick, Grosse Pointe Farms, MI (US); Barney Bauer, Rochester, MI (US); Henk B. Helleman, Holly, MI (US); Simin Zeng, Rochester Hills, MI (US); Daqing Zhang, Troy, MI (US); Hideki Mizuno, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 656 days.

(21) Appl. No.: 11/802,101

(22) Filed: May 18, 2007

(65) Prior Publication Data

US 2007/0284863 A1 Dec. 13, 2007

Related U.S. Application Data

(60) Provisional application No. 60/747,708, filed on May 19, 2006.

(51) Int. Cl.
*B60R 21/26* (2006.01)
(52) U.S. Cl. ....................................... 280/742
(58) Field of Classification Search .................. 280/741, 280/728.2, 742
See application file for complete search history.

(56) References Cited

U.S. PATENT DOCUMENTS

| | | | | |
|---|---|---|---|---|
| 5,697,637 A | * | 12/1997 | Milne, III | 280/728.2 |
| 5,992,874 A | * | 11/1999 | Sugiyama et al. | 280/728.2 |
| 6,029,992 A | * | 2/2000 | Vendely et al. | 280/728.2 |
| 6,328,332 B1 | * | 12/2001 | Schutz | 280/728.2 |
| 6,592,141 B1 | * | 7/2003 | Dancasius et al. | 280/728.2 |
| 6,669,230 B1 | * | 12/2003 | Nakashima et al. | 280/735 |
| 6,702,318 B2 | * | 3/2004 | Rose et al. | 280/728.2 |
| 7,052,041 B2 | * | 5/2006 | McCormick | 280/741 |
| 7,396,040 B2 | * | 7/2008 | Enders et al. | 280/730.1 |
| 7,401,810 B2 | * | 7/2008 | Brisighella et al. | 280/741 |
| 2002/0101067 A1 | * | 8/2002 | Breed | 280/741 |
| 2003/0057684 A1 | * | 3/2003 | Freesmeier | 280/730.2 |

(Continued)

FOREIGN PATENT DOCUMENTS

WO WO 2006/101601 A2 9/2006

OTHER PUBLICATIONS

Clark, F. G., et al., "Concorde, the Story of the World's Most Advanced Passenger Aircraft", 1976 Phoebus Publishing, ISBN 0-7026-0013-X, pp. 18 and 19.

*Primary Examiner* — Paul N Dickson
*Assistant Examiner* — Karen A Beck
(74) *Attorney, Agent, or Firm* — Foley & Lardner LLP

(57) ABSTRACT

An airbag module integrates the components required for gas generation, thereby eliminating the need for a separate inflation component. The airbag module can comprise a cover with a pocket, a gas generant container, an inflatable cushion an upper and lower retainer housing, and an inflation gas generation system in fluid communication with the cushion. The airbag module does not comprise a discrete inflator that is functional outside the assembled airbag module. The gas generant container houses a package of solid gas generating compound. The energetic materials of the propellant do not become functional as a gas generation source until the cover is secured to the lower retainer housing.

20 Claims, 10 Drawing Sheets

U.S. PATENT DOCUMENTS

| | | | |
|---|---|---|---|
| 2003/0101893 A1* | 6/2003 | Cord | 102/530 |
| 2004/0183292 A1* | 9/2004 | Ruckdeschel | 280/741 |
| 2005/0212274 A1* | 9/2005 | Massanetz et al. | 280/740 |
| 2006/0207459 A1* | 9/2006 | Nishina | 102/202 |
| 2006/0208470 A1* | 9/2006 | Tsujimoto et al. | 280/731 |
| 2006/0214400 A1 | 9/2006 | Enders et al. | |
| 2007/0284863 A1* | 12/2007 | Bostick et al. | 280/741 |
| 2008/0272580 A1* | 11/2008 | Breed | 280/735 |
| 2009/0079167 A1* | 3/2009 | Shimazaki et al. | 280/728.2 |
| 2009/0115175 A1* | 5/2009 | Nishimura et al. | 280/741 |

* cited by examiner

AIRBAG MODULE WITH INTEGRATED GAS GENERATION

CROSS-REFERENCE TO RELATED PATENT APPLICATIONS

This application claims priority to U.S. Provisional Patent Application No. 60/747,708 filed May 19, 2006, which is incorporated herein by reference in its entirety.

BACKGROUND

This invention relates generally to airbag modules with integrated gas generation. More specifically, this invention relates to airbag modules that do not require a discrete inflator or a discrete filter.

The standard airbag module comprising a cover, a baseplate or reaction container, an inflatable cushion which is folded in the undeployed state, and a discrete gas generator or inflator is well known in the art.

Traditional airbag module assembly processes usually install the discrete gas generator after the airbag module is substantially assembled. The reason is that gas generators are typically related as stand alone assemblies and can comprise a housing containing an igniter, a gas generating compound, a combustion chamber, a filter, and output orifices. However, these conventional gas generators could be activated by an electrical signal and produce gas without being physically installed in the airbag module. Thus, in actual practice, they are handled with special countermeasures to reduce any risks of activation during the shipping and handling of the assemblies.

Another aspect of existing gas generators is that they may use orifices that are drilled in radial or slightly off-axis radial directions that allow the gas to be projected only in radial or near radial directions. In some gas generator assemblies, additional parts, known as diffusers, are used in combination with the gas generator to project the gas flow into a desired direction. The drawback to these gas generators is that the radial projection of the gas flow of these gas generators will make the gas impinge onto surfaces directly outside the inflator housing, such as the surface of a diffuser or the fabric of an airbag cushion. When the gas jet is stopped by these surfaces, a local area of high pressure and high temperature is created which may cause high structural stress and/or abrasion of the surface.

Another aspect of existing gas generators is that they may use external parts, such as diffusers, to alter the properties of the gas flowing from the gas generator during inflation into more favorable properties for flow into an airbag cushion. However, such diffusers require a certain volume to alter the gas properties for which space must be made available between the gas generator and the airbag cushion.

Existing gas generators may use specially shaped pellets to create a gas flow more suitable for direct flow into an airbag cushion.

Existing gas generators also may use internal heat sinks to alter the properties of the gas, especially in the initial stage of the gas generation process. However, the heat sinks in existing gas generators require additional space and require careful dimensioning to avoid rattles.

Furthermore, existing gas generators are characterized in that they have one volume of high pressure, generally in the combustor chamber, which determines the flow of gas. The exit port holes are dimensioned to sustain the oxidization process in the combustor chamber. These gas generators require a flow path of constantly decreasing pressure to sustain the flow.

SUMMARY

One embodiment relates to an airbag module. The airbag module comprises: a cover with a pocket; a lower retainer ring; a gas generant container including gas generant propellant, at least a portion of the gas generant container being positioned within the pocket; a lower retainer ring; and an inflatable cushion. The gas generant propellant becomes functional as a gas generation source after the cover is secured to the lower retainer ring.

According to another embodiment, a method of assembling an airbag module is provided. The method comprises: providing a cover with a pocket; providing a gas generant container with a gas generant propellant; attaching an inflatable cushion to an upper or lower retainer ring; positioning the gas generant container within the pocket of the cover; and attaching the cover to the lower retainer ring. The gas generant propellant becomes functional as a gas generation source only after the cover is attached to the lower retainer ring.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description and the accompanying exemplary embodiments shown in the drawings, which are briefly described below.

DETAILED DESCRIPTION

According to an embodiment, an airbag module and an assembly method is disclosed, which integrates the components required for gas generation, thereby eliminating the need for a separate inflation component.

According to another embodiment, a mechanism for buffering an amount of gas between the gas generating source and the inflatable cushion and a mechanism for trapping solid combustion particulates within the confines of the module housing without the need for discrete filters are also disclosed.

The airbag module can comprise a cover, a gas generant container, an inflatable cushion, and an inflation gas generation system in fluid communication with the cushion but without having a discrete inflator that is functional outside the assembled airbag module. The gas generant container houses a package of solid gas generating compound.

Propellant can be mixed, pressed and packaged in an environmentally sealed package and shipped to the airbag module assembly plant. The energetic materials of the propellant do not become functional as a gas generation source until the cover housing is secured to the lower retainer housing.

Figures 1A, 1B:
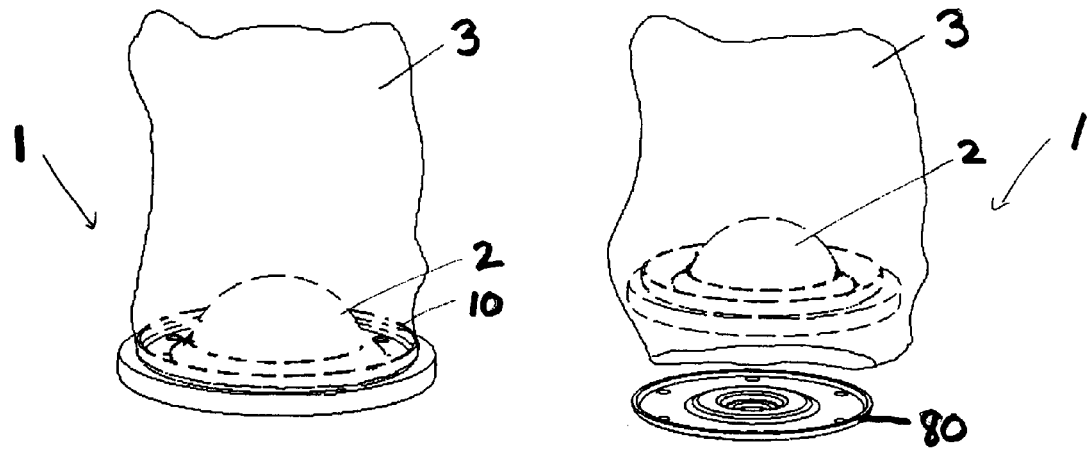
FIGS. 1(a) and 1(b) show an airbag module with a reaction chamber and an inflatable curtain.
Figure 1C:
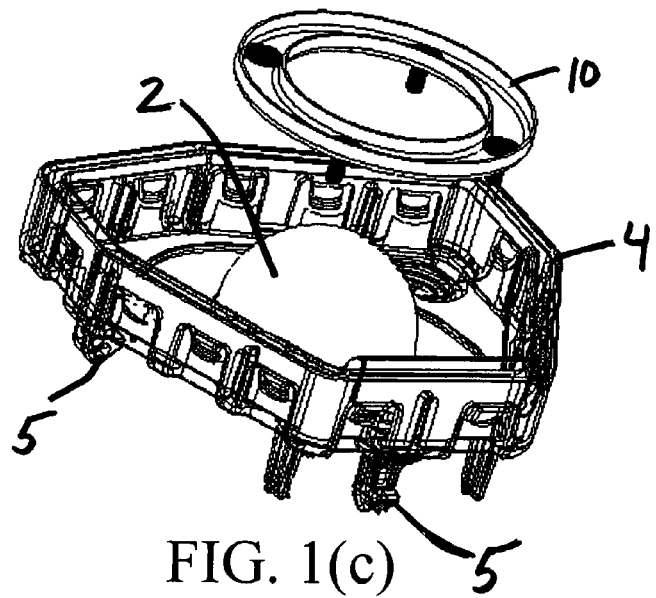
FIG. 1(c) shows a mechanism for snapping the airbag module into a steering wheel of a vehicle.

FIGS. 1(a)-1(c) shows the airbag module 1 according to an embodiment. The airbag module 1 comprises a reaction chamber 2 and an inflatable cushion 3. The inflatable cushion 3 can be attached to the reaction chamber 2 in any manner known in the art. For example, the inflatable cushion can be attached to an upper retainer ring 10 of the reaction chamber 2 as seen in FIG. 1(a) or to the lower retainer ring 80 in FIG. 1(b). The inflatable cushion can be any cushion known in the art, for example the inflatable cushion 3 can be for a driver's seat front airbag, a front or backseat passenger seat front airbag, or a side curtain that can cover up one or more side windows of a vehicle. FIG. 1(c) shows an example of a mechanism 4 which is used to snap the airbag module 1 (the inflatable cushion 3 is not shown) into a steering wheel (not shown) of a vehicle using a series of hooks 5.

Figure 2A:
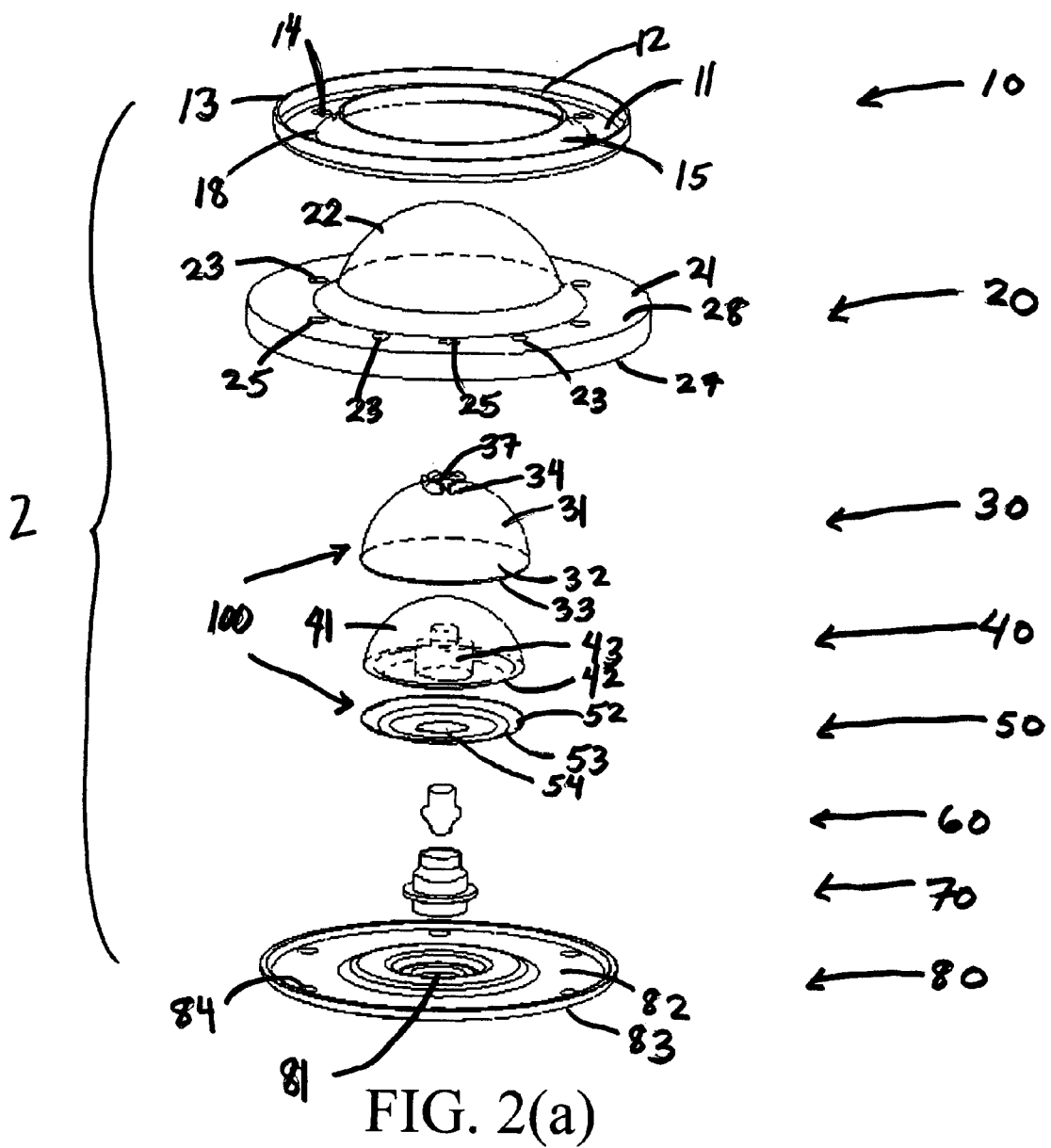
FIGS. 2(a) and 2(b) show the exploded views of the reaction chamber according to different embodiments.
Figure 2B:
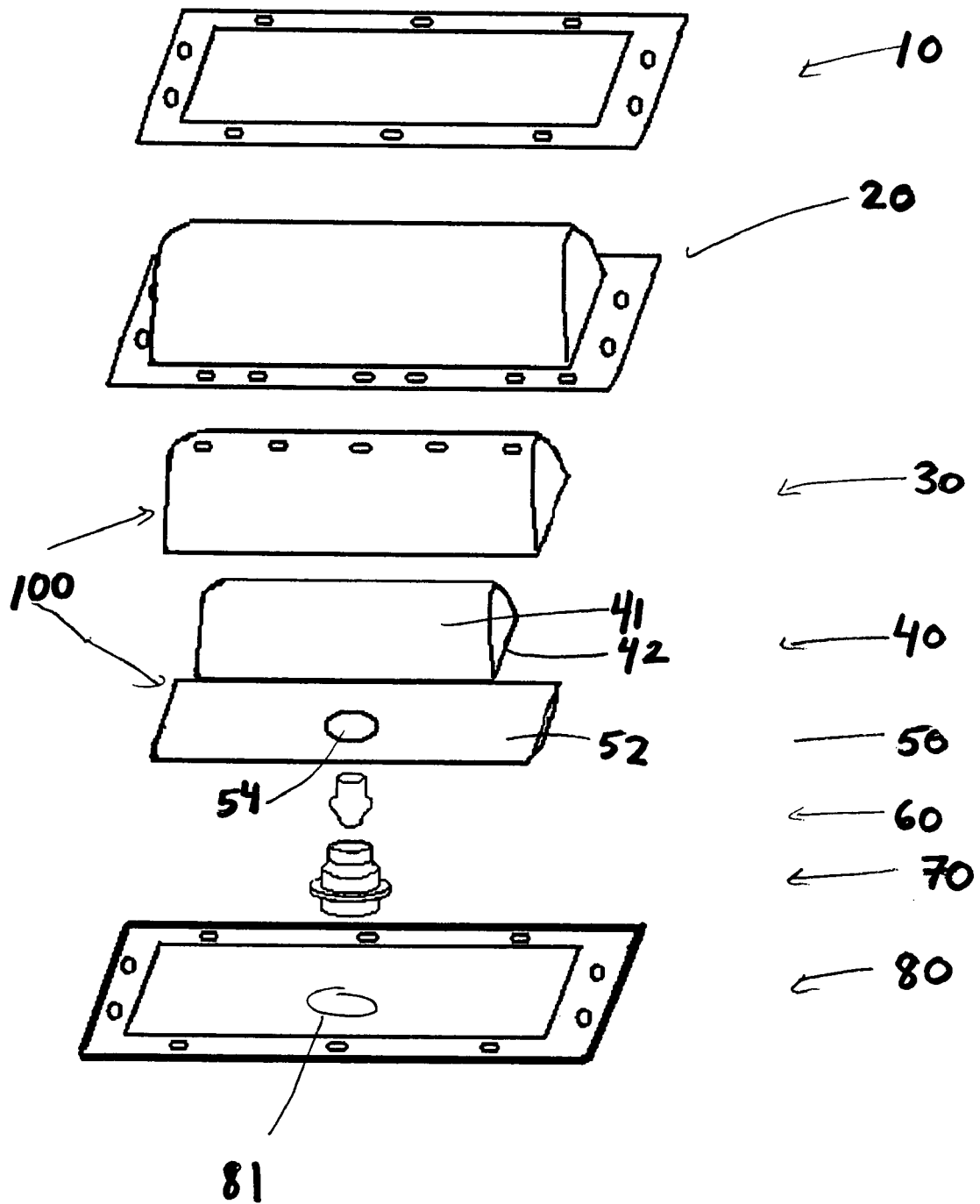
Figure 3A:
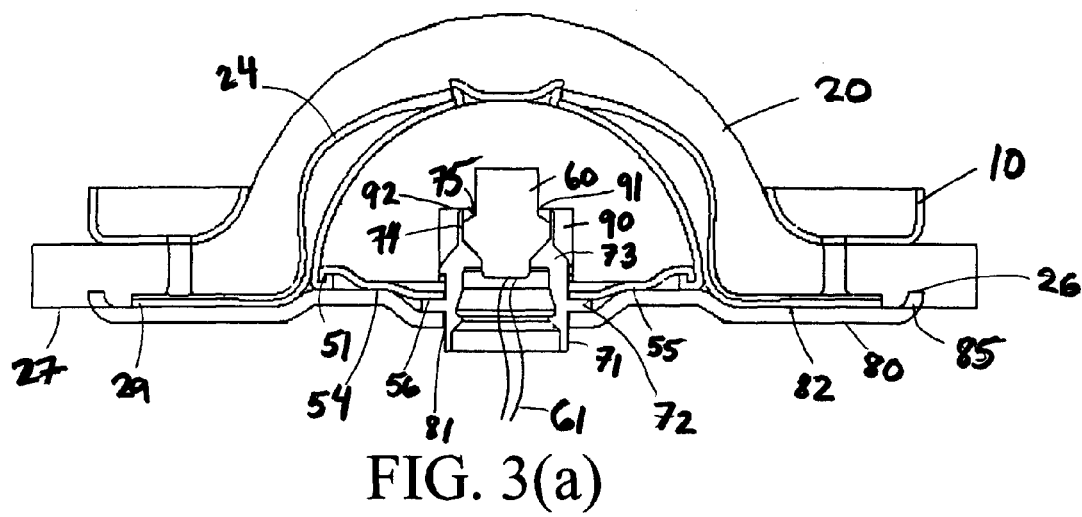
FIG. 3(a) shows a cross-sectional view of the assembled reaction chamber according to an embodiment.

FIGS. 2(a) and 2(b) show exploded view of the reaction chamber 2 while FIG. 3(a) shows a cross-sectional view of the assembled reaction chamber 2. The reaction chamber 2 can comprises an upper retainer ring 10, a cover 20, an upper generant cup 30, a generant packet 40, a lower generant cup 50, an initiator 60, a bore body seal 70, and a lower retainer ring 80. Each of these components will be described, in turn, below.

The upper retainer ring 10 includes a flat surface 11, an inner rim 12, an outer rim 13, and a plurality of holes 14. The upper retainer ring 10 also has a curved portion 15, which is situated between the flat surface and the inner rim 12. The flat surface 11, the inner rim 12, and the curved portion 15 are shaped such that they can mate with an external surface of the cover 20, as described below. The holes 14 are in the same configuration as the holes in the cover 20 and the lower retainer ring 80. Bolts (not shown) are fed through the holes 14, the holes in the cover 20, and the holes in the lower retainer ring 80. The bolts are screwed into nuts (not shown) such that the entire assembly is one compact modular unit. In addition, the upper retainer ring 10 has holes 18 that cover the gas holes 25 of the cover 20 and which will be used to channel gas flow from the reaction chamber 2 to the inflatable cushion 3. The upper retainer ring 10 can be made from any suitable metal, such as stamped steel The cover 20 includes a flange 21 and a pocket 22. The flange 21 has a plurality of bolt holes 23 which correspond to the holes 14 in the upper retainer ring 10, a bottom surface 27, and a top surface 28. The pocket 22 is shaped such that the upper generant cup 30 and the generant packet 40 can fit inside thereof. For example, FIG. 2(a) shows the pocket to be dome-shaped but any suitable shape can be used, such as rectangular, triangular, or cubic. For example, FIG. 2(b) shows an embodiment of the cover 20 in which the pocket is shaped like a half-cylinder for use in a side curtain for a vehicle.

Figure 5:
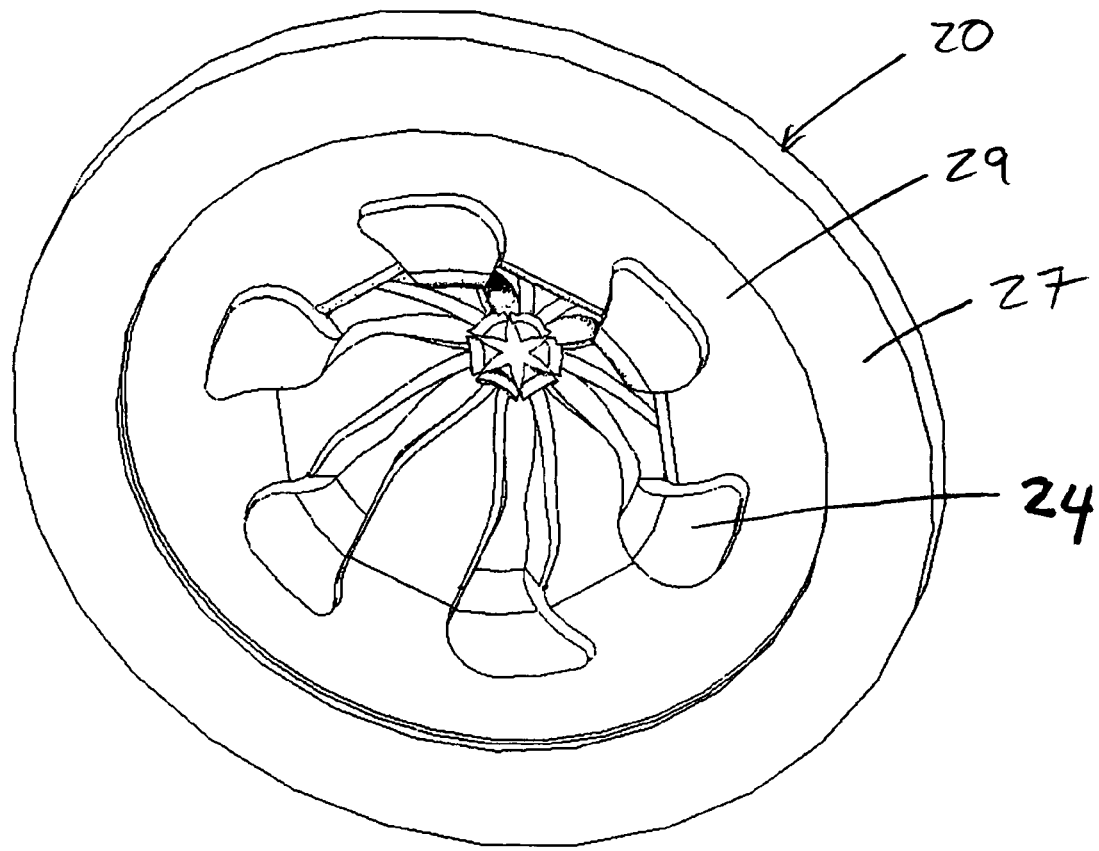
FIG. 5 shows a bottom view of the cover and cover plate according to an embodiment.

The pocket, in addition, has flow orifices 24 (shown in FIG. 3) for the flow of gas from the upper generant cup 30 toward the inflatable cushion. These flow orifices 24 begin at the top of the pocket 22 on its internal surface and extend down the internal surface of the pocket 22 and continue onto the bottom surface 27 of the flange 21. Holes 25 extend from the top surface 28 of the flange 21, through the flange 21, and to the flow orifices 24. These holes allow inflation gas to be in fluid communication with the inflatable cushion, which would have an opening for the inflation fluid immediately adjacent to the holes as seen in FIGS. 1(a) and 1(b). A detailed description of the flow orifices will be described shortly; however, it should be pointed out that the flange 21 also includes a groove 29 on its bottom surface 27 to make room for the flow orifices 24, as seen in FIGS. 3 and 5.

The cover 20 has a groove 26 on the bottom surface 27 of the flange 21 which mates with a rim 85 on the outer periphery of the lower retainer ring 80, as seen in FIG. 3(a). This connection of the rim 85 with the groove 26 aids in sealing the gas so that is does not leak out between the retainer ring 80 and the cover 20.

The cover 20 can be made from any suitable metal, injection molded material or die cast material, such as magnesium or aluminum, however, the material should be chosen such that material of the cover 20 itself is not subject to becoming fuel for the gas generation process. For example, it may be desirable to use a ceramic coating over the cover 20 if it is made from magnesium.

The upper generant cup 30 and the lower generant cup 50 make up a gas generant container 100 which contains a solid propellant material used to expand the inflatable cushion. The gas generant container 100 fits inside the pocket 22 of the cover 20. Both the upper generant cup 30 and the lower generant cup 50 can be made from stamped steel.

As to the upper generant cup 30, it has an external surface 31 with an opening 32 with an edge 33. The external surface 31 is shaped such that the upper generant cup can fit inside the pocket 22 of the cover 20. For example, FIG. 2(a) shows the external surface 31 being dome-shaped, but any suitable shape can be used. In addition, the upper generant cup has a first set of holes 34 located on the external surface 31. The holes 34 can either be open or closed by either plastic or thin metallic foil seals to provide some environmental sealing to protect the propellant.

Figure 3B:
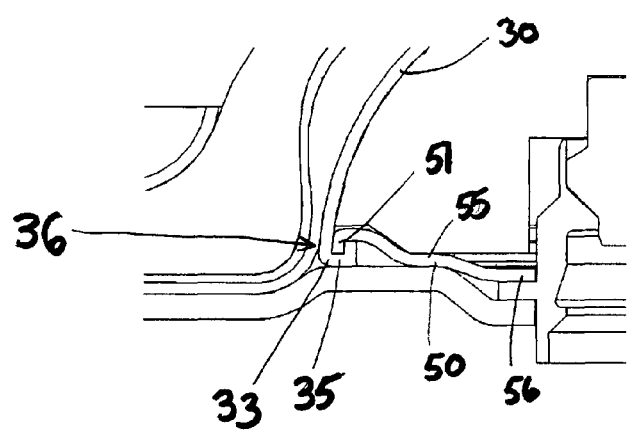
FIG. 3(b) shows a blow-up view of the crimp connection between the upper and lower gas generant cups.

As seen in FIG. 3(b), the edge 33 of the upper generant cup includes a groove-like structure 35 around the periphery of the opening 32. This groove-like structure 35 mates with a hook-like structure 51 on the lower generant cup 50. The groove-like structure 35 and the hook-like structure 51 form a crimp connection 36 which is used to retain the generant material.

At the top of the external surface 31, there are small hoods 37, which are used to channel the gas flow from the gas generant container 100 to the flow orifices 24 of the cover 20. The hoods 37 can be made from any known material such as stamped steel and shaped in a manner to efficiently channel the gas flow from the upward direction though holes 34 of the upper generant cup 30 to the more lateral direction at the entry of the flow orifices 24. Each hole 34 in the upper generant cup 30 has a corresponding hood 37 and a flow orifice 24.

The lower generant cup 50 can generally have a saucer shape that is circular so as to correspond with the upper generant cup 30. However, any other suitable shape can be used. The lower cup has an upper surface 52, a lower surface 53, and an aperture 54 running from the center of the upper surface 52 to the center of the lower surface 53. The aperture 54 allows the body bore seal 70 and the initiator 60 to be brought into the gas generant container 100 to ignite the propellant contained therein. As previously mentioned, the lower generant cup 50 also includes a hook-like structure 51 which is used to make a crimp connection 36 between the upper and lower generant cups as seen in FIG. 3(b).

The lower generant cup is also contoured along its upper and lower surfaces with a lower portion 56, an intermediate portion 55, and the hook-like structure 51 as seen in FIG. 3(a). The lower portion 56 is dimensioned such that the lower surface can firmly hold the body bore seal 70 against the lower retainer ring 80 while the hook-like structure 51 is able to be used in the crimp connection 36 to the upper generant cup 30. The intermediate portion 55 rests against a portion of the upper surface 82 of the retainer ring 80 for support.

Inside the gas generating container is a generant material in the form of propellant granules. The generant material is retained because the upper and lower generant cups are crimped together at a crimp connection 31. The geometric form and size of the propellant granules can be tailored for the desired rate of gas production.

In another embodiment, instead of the generant material being retained inside the upper and lower generant cups, the gas generate can be pre-packaged into a hermetically sealed bag. This bag with generant material is shown as the generant packet 40 in FIG. 2(A). This embodiment is particularly advantageous since the sealed bag prevents moisture or other contaminants from contacting the generant material, which is more convenient than the conventional method of welding the generant material inside the generant holding container. As with the previous embodiment, the upper and lower generant cups are crimped closed to retain the generant packet 40. The geometric form and size of the propellant granules can be tailored for the desired rate of gas production. The generate packet 40 can be vacuum packed and formed into a specific shape. For example, FIG. 2(a) shows that generant packet has an upper dome shape surface 41 that corresponds with the interior of the upper generant cup 30, a lower saucer shape surface 42 that corresponds with the upper surface 52 of the lower generant cup 50, and an aperture 43 that corresponds to the shape of the initiator 60 that protrudes into the gas generant container 100 through the aperture 54 in the lower generant cup. FIG. 2(b) shows that the generant packet has an upper surface 41 that is shaped like a half cylinder to correspond with the interior of the upper generant cup 30, a lower curved shaped surface 42 to corresponds to the upper surface 52 of the lower generant cup 50, and an aperture (not shown) that corresponds to the shape of the initiator 60 that protrudes into the gas generant container 100 though the aperture 54 in the lower generant cup.

If a hermetically sealed bag is used, any suitable material can be used as long as it is capable of withstanding the environment of a motor vehicle. For example, the hermetically sealed bag can be aluminized Mylar or plastic.

The initiator 60 is a commonly available airbag squib containing a quantity of between 35 and 225 mg of a pyrotechnic compound, typically of zirconium potassium perchlorate (ZPP) or titanium potassium perchlorate (TPP) although other compounds, such as nitrocellulose and lead styphanate, could also be used. The initiator 60 is set inside the body bore seal 70 in which the initiator's active end protrudes into the gas generate container 100 and is in close communication with the gas generating material or the generant packet 40. Although FIGS. 2(a) and 2(b) show a single initiator 60, the reaction chamber 2 can have more than one initiator. For example, there can be a series of initiators 60 along the longitudinal direction of the reaction chamber of FIG. 2(b). In such a case, there would be a hole 54 in the lower generant cup 50, a body bore seal 70, and a hole 81 in the lower retainer ring 80 for each of the initiators 60.

The body bore seal 70 holds the initiator 60 by a cap 90 (as seen in FIG. 3(a)). The body bore seal 70 can be cylindrical in shape but any suitable shape can be used. The body bore seal 70 comprises a large circumferential surface 71, a flange 72 at a point along the large circumferential surface, a tapered portion 73, a smaller circumferential surface 74, and an aperture 75. The large circumferential surface is sized such that it fits in the aperture 81 of the lower retainer ring 80 and the aperture 54 of the lower generant cup 50. The flange 72 is sized such that it is captured between the bottom surface 53 of the lower generant cup 50 and the upper surface 82 of the lower retainer ring 80. The aperture 65 is bored through the longitudinal direction of the body bore seal 70 and has a tapered ledge 76 inside to seat the initiator 60. The body bore seal can be any suitable metal such as stainless steel.

The cap 90 has an inner aperture that matches the outer contours of the body bore seal 70. The front section of the initiator 60 protrudes through a hole 91 that penetrates the surface 92 of the cap. The cap 90 and body bore seal 70 can be attached to each other by any known means in the art, such as set screws or having female threads on the cap 90 that mate with male threads on the body bore seal 70.

The lower retainer ring 80 is positioned over the open end of the pocket 22 of the cover 20 such that the upper generant cup 30, the generant packet 40 or generant material, the lower generant cup 40, the initiator 60, and the body bore seal 70 are encased between the pocket 220 and the lower retainer ring 80. The retainer ring 80 has an aperture 81, an upper surface 82, a lower surface 83, and a plurality of bolt holes 84. The upper and lower surfaces of the retainer ring 80 are contoured such that the flange 72 of the body bore seal 70 and the intermediate portion 55 of the lower generant cup 50 sit flat on the upper surface of the retainer ring 80. As previously mentioned, the lower retainer ring 80 also includes a rim 85 on its outer periphery so as to mate with the groove 26 of the flange 21 so as to seal potential leaks. The lower retainer ring is secured to the cover 22 by any known fastening device or devices, such as bolts though the bolt holes 84, a twist-lock joint, or a combination of both. The lower retainer ring 80 can be any suitable material, such as stamped steel or other metal.

Referring to the assembled reaction chamber in FIG. 3(a), the function of the gas generating feature will now be explained. Upon an indication of a crash event from a vehicle's sensors, an electrical signal travels through wires 61 to the igniter 60 in a traditional manner. In response to the ignition signal, the small explosive charge included within the squib ignites which in turn ignites the propellant in the gas generant container 100, i.e., the upper and lower generant cups, by penetrating the hermetically sealed bag, if present. The pressure of the burning propellant is controlled by the sizes of the holes 34 in the upper generant cup 30. Generated gas flows through the flow orifices 24 in the cover 20 and out the holes 25 into the folded inflatable cushion. The rest of the inflation process is traditional.

Now, the flow orifices 24 in cover 20 will now be described. The use of punched exhaust orifices has been developed for tubular extensions for side curtain airbag inflators for the purpose of projecting the gas flow in a desired direction. They are, however, not an integral part of the gas generator. In contrast, according to an embodiment, the flow orifice 24 can comprise dimple-shaped, punched orifices in the wall of the cover 20 to direct the gas flow in a preferred direction. The punched, dimple shaped orifice guides the exhausted gas along the internal surface of the cover 20, where no interaction with other surfaces will occur. This action allows the gas to diffuse, thus changing the gas properties such that localized areas of high pressure and temperature will not occur. This, in turn, will decrease localized peak stress levels due to the gas pressure. The ability to aim or direct the flow at the source into a desired direction will decrease the energy absorption and momentum loss associated with methods that change the direction of the flow in a later stage.

Figure 4:
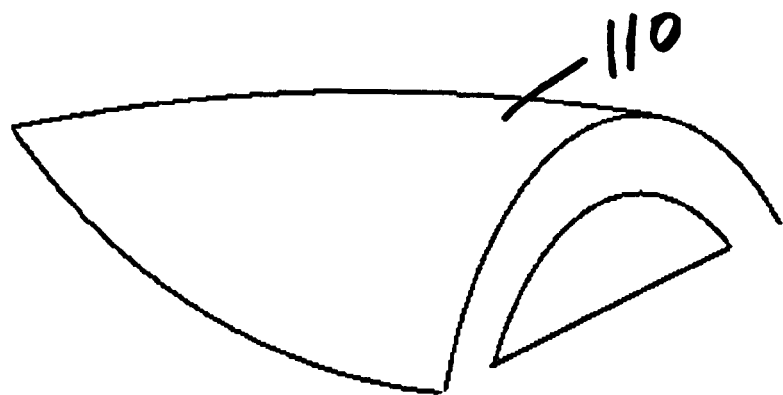
FIG. 4 shows a schematic of an example of a dimple shaped orifice which would be punched into the interior of the cover of the reaction chamber.
Figure 8:
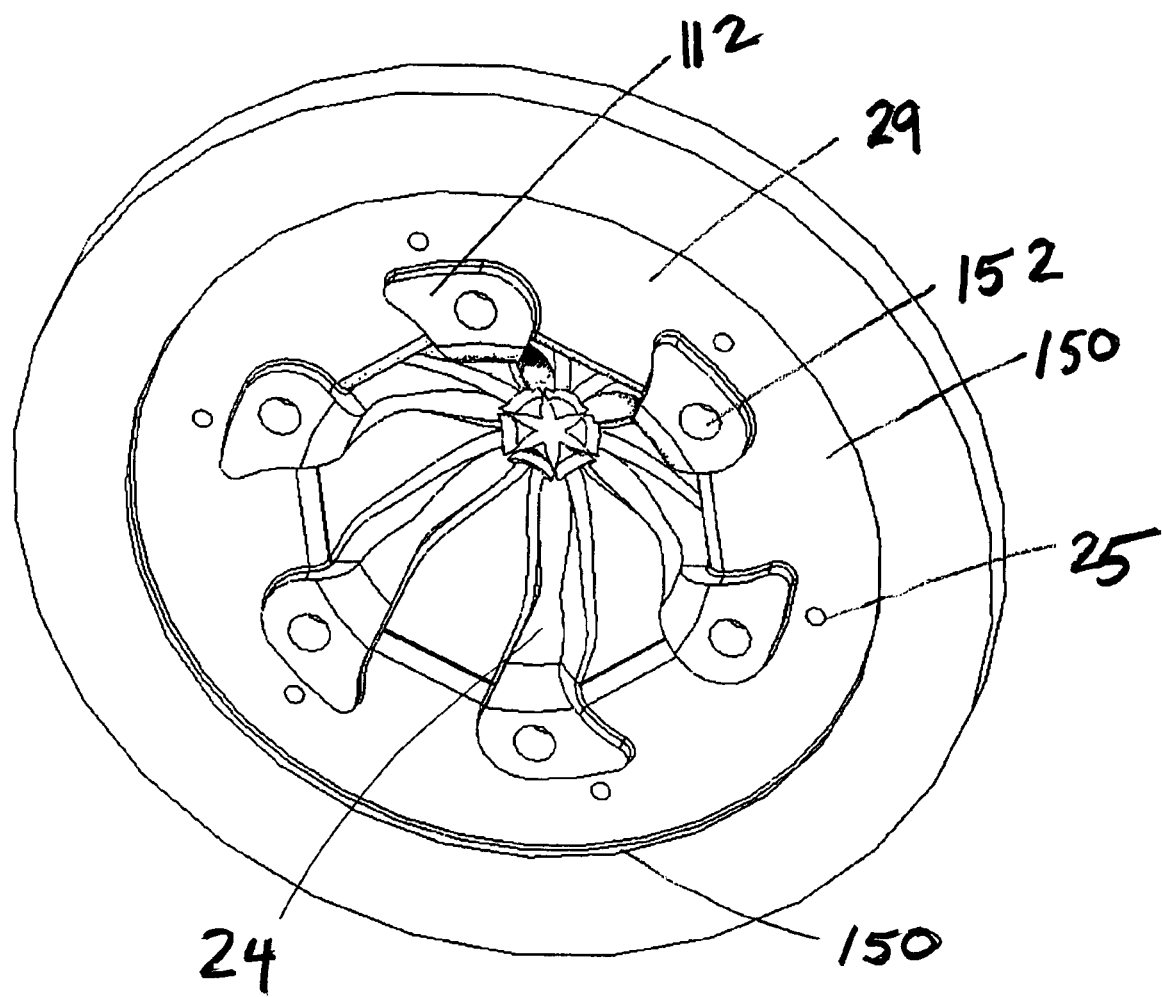
FIG. 8 shows a bottom view of the cover and cover plate in which a groove in the cover is used as a centrifugal collector channel according to an embodiment.

FIG. 4 shows a schematic of an example of a dimple shaped orifice 110 which would be punched into the interior of the cover 20. The art of cutting and punching a dimple in sheet metal is well understood. It is also understood that to achieve the good dimensional tolerance, the elastic spring-back of the metal must be taken into consideration. The dimensions and dimensional tolerances are determined by the dynamic gas properties of the gas generant, as detailed below. In addition to dimple-shaped, punched orifices in the walls, the flow orifices 24 also comprise cover plates 112 that are used to over the dimple shaped orifices. FIG. 8 shows that the cover plates 112 covers the dimple shaped orifices. Both the cover plates and the dimple shaped orifices extend from the top of the pocket 22 where the gas flow from the gas generant container 100 enters through the holes 34 and terminate in the groove 29 where the holes 25 reach the bottom surface 27 of the flange. The depth of the groove 29 should be dimensioned such that the cover plates can fit inside them, which allows the lower retainer ring 80 to make contact with that portion of the bottom surface 27 of the flange 21 which does not have the groove 29, as seen in FIG. 3.

In addition, the flow orifices 24 have a changing cross sectional area. As a result, gas is communicated from the gas generant container within the pocket 22 through the flow orifice 24, through the exit holes 25, and to the inflatable cushion. The design of the flow orifices 24 utilizes supersonic and subsonic gas flow separated by a shock wave to maintain the combustion pressure within the pocket 22 of the cover 20 while controlling the gas pressure and gas speed at the exit holes 25.

Figure 6:
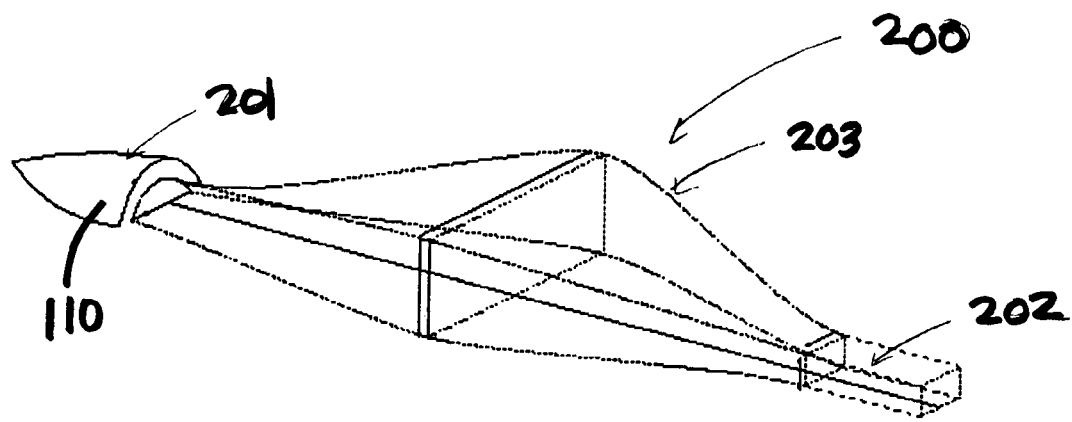
FIG. 6 shows an example of a dimensional design of a flow path according to an embodiment.
Figure 7:
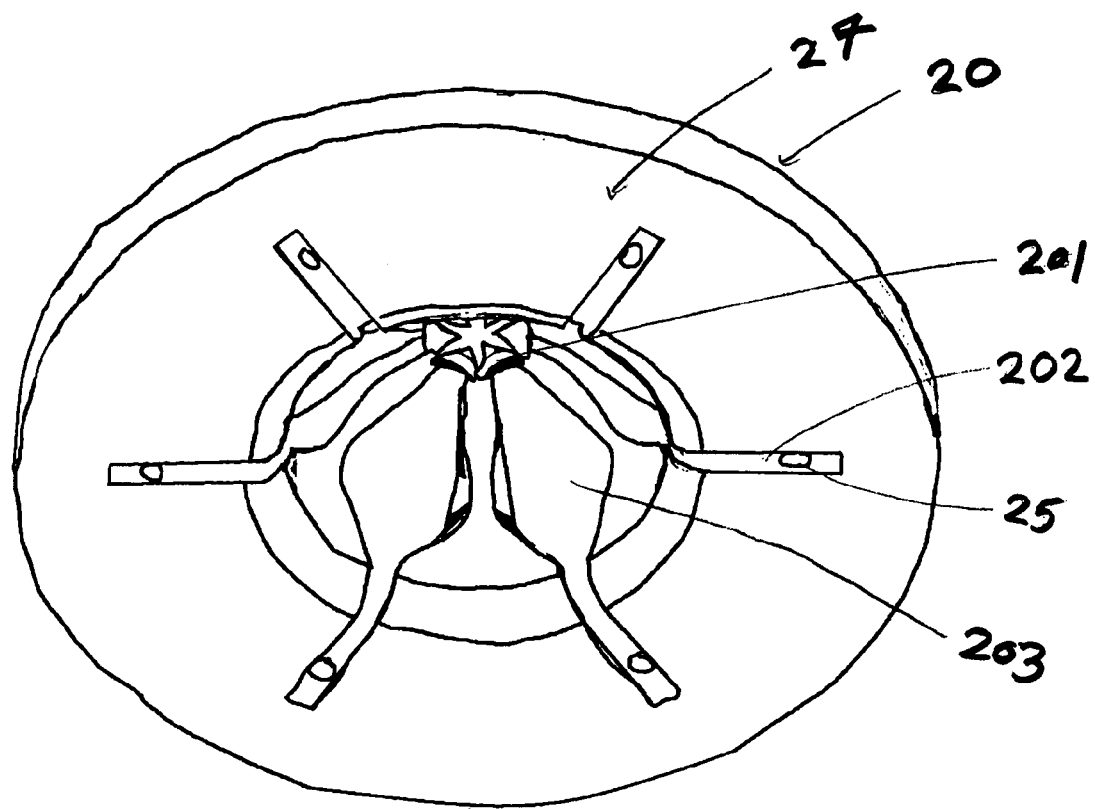
FIG. 7 shows the dimple shaped orifices in the pocket of the cover according to an embodiment.

FIG. 6 shows an example of a dimensional design of a flow path 200 according to an embodiment, while FIG. 7 shows its application in the cover 20. The flow path 200 is confined in the cover 20 with two distinct volumes of high pressure connected by a volume with supersonic gas flow 203. The first high pressure volume 201 is located near the combustor chamber, i.e., the holes 34 of the upper gas generant cup 30 and is governed by the gas generating process (generally the oxidization of a combustible within the gas generant container 100). The second high pressure volume 202 is located downstream from the first volume 201 and includes the volume near the exit, i.e., the holes 25 of the cover 20 holes. The two distinct volumes of high pressure connected by a volume of supersonic flow 203 allow for the gas properties in the second volume 202 (near holes 25) to be different from that of the first volume 201 (near the gas generant container 100 where combustion occurs). The supersonic flow that connects the two volumes keeps the pressure in the second volume from traveling upstream to the first volume. Thus, the gas properties at the first and second volumes can be individually tailorable such that the gas properties of the second volume can be tailored to be more favorable for flow into the inflatable cushion while the gas properties of the first volume are governed by the combustion process.

To establish the design of the flow orifice 24, the art of fluid thermodynamics, in both the subsonic and supersonic domains is well understood. Computational Fluid Dynamics tools are utilized to establish the length and cross-sectional profile of the flow channel. A first region 201, immediately adjacent to the gas generant container 100 (the combustor chamber), is dimensioned in such a way that the gas emitting from the gas generant container 100 expands into a supersonic flow. A second zone 202, downstream from the first, is dimensioned such that the velocity of the gas decreases to subsonic through a number of shock waves. The second region of high pressure 202 is created at the smallest cross-section at the end of this second region 202. The cross-sectional area determines the pressure level in this second region for a given gas generator.

A flow path, similar to an embodiment, exists in the inlet channels of gas turbine engines of military jet planes and supersonic commercial aircraft (notably the Concorde). In embodiments, the gas properties are changed from low-density, super-sonic flow at the inlet opening to high-density, sub-sonic flow near the engine, as described in Clark, F. G. and A. Gibson, "Concorde, the Story of the World's Most Advanced Passenger Aircraft" 1976 Phoebus Publishing, ISBN 0-7026-0013-X (herein incorporated by reference in its entirety).

FIG. 7 shows a bottom view of the cover 20 in which the flow path of FIG. 6 is designed into the walls of the cover 20.

Figure 9:
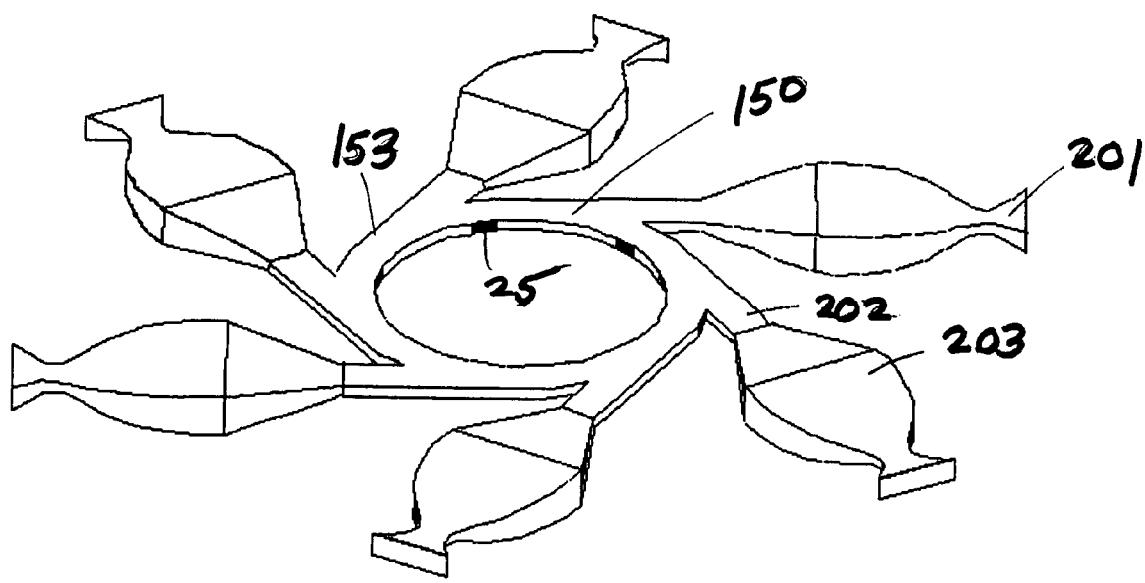
FIG. 9 shows a schematic view of the overall flow channel incorporating the centrifugal collector channel according to an embodiment.

In addition to the above flow orifices 24, bends in the flow channel can be used for capturing and/or providing plating surfaces for particulates. With these bends, the need for dedicated filters and heat sinks can be eliminated. FIG. 8 shows an embodiment in which the groove 29 is used as a centrifugal collector channel 150. This is done by adding apertures 152 to the cover plates 112 of the flow orifices 24 and moving the holes 25 on the flange 21 such that the holes 25 do not make direct fluid communication with the flow orifice 24 but the inflation gas must flow through the flow orifice 24, exit out of holes 152, flow in the channel 150, and exit the channel through holes 25. The additional channel 150 gives the initial shock wave an opportunity to run out without reflecting back at the flow orifices. The collector channel 150 of the cover 20 also provides a long path for particulates to be spun and plated to the outside rim 153 of the channel 150 to help eliminate the need for filters and to reduce the stress on the structural elements of the airbag module. The effect using the groove 29 as a centrifugal collection channel 150 is schematically provided in FIG. 9 in which gas flows into a first region of high pressure 201, through a volume with supersonic flow 203, through a second region of high pressure 202, and into the centrifugal collection chamber 150. The gas flow enters a long path in which particulates are plated to the outside rim 152 and eventually exits out the holes 25 into the inflatable cushion.

Figure 10:
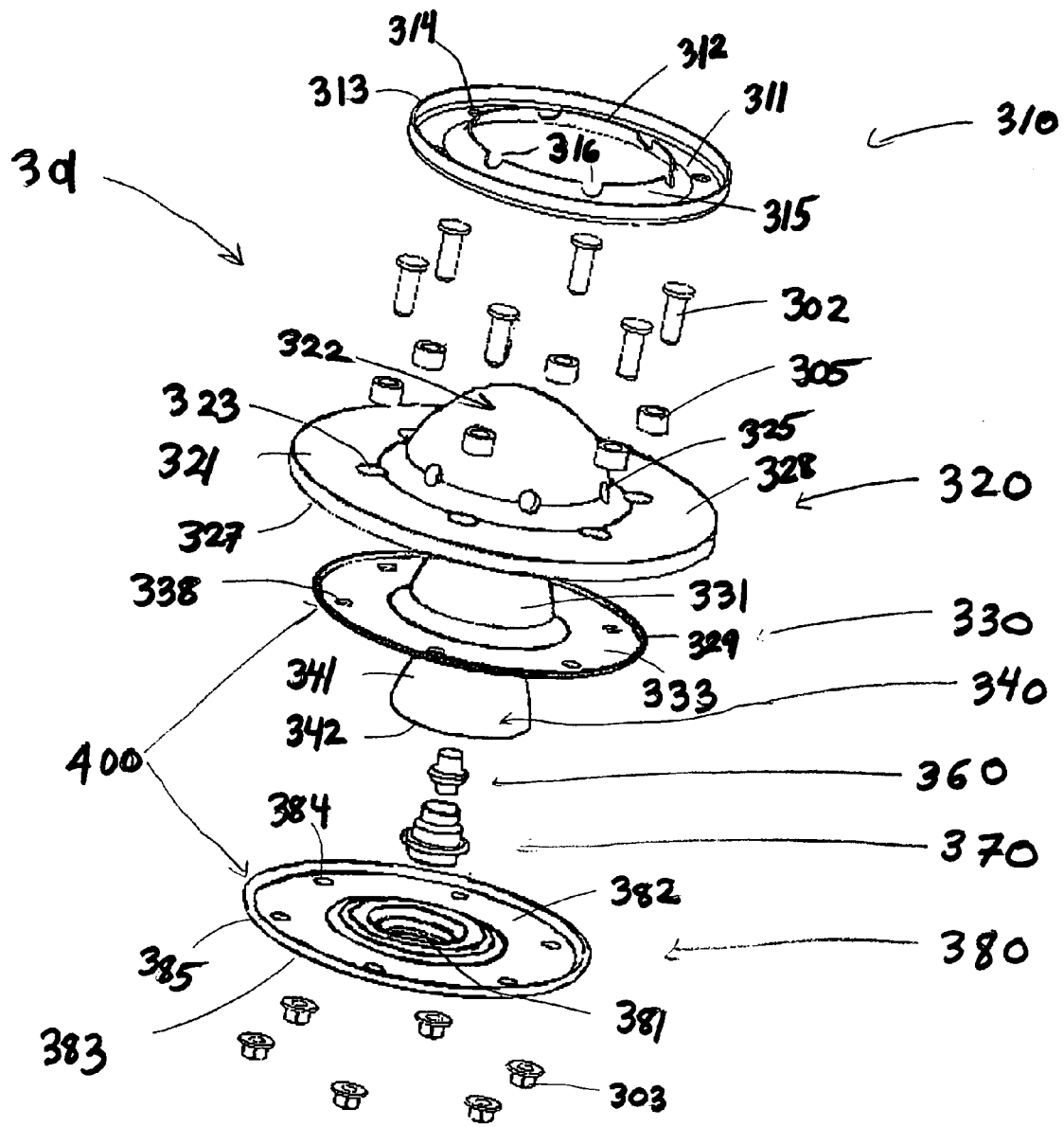
FIG. 10 shows an exploded view of the reaction chamber according to another embodiment.
Figure 11:
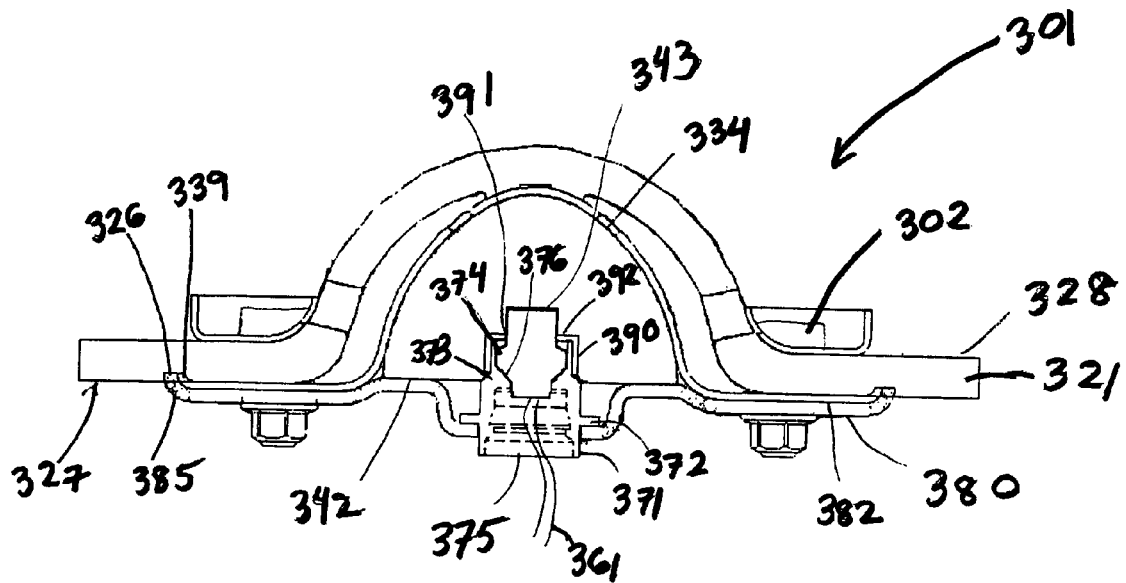
FIG. 11 shows a cross-sectional view of the assembled reaction chamber of FIG. 10.
Figure 12:
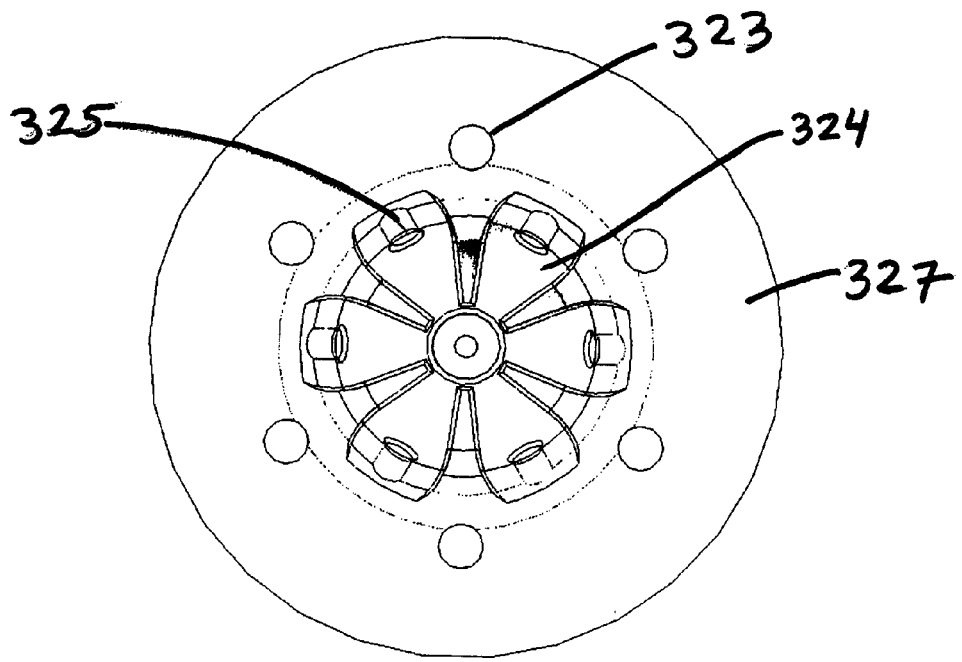
FIG. 12 shows a bottom view of the cover of FIG. 10.

In another embodiment depicted in FIGS. 10-12, the same methods, components, and materials can be used as detailed above but instead of utilizing high pressure supersonic flow, a divergent flow arrangement is used. The divergent channel allows gas to flow in the direction of increasing cross sectional area. This arrangement allows for much lower pressures. Although mass flow tunability may be sacrificed, all other benefits of the embodiments may be maintained. In addition, this embodiment may have the additional benefit of having lower material costs while still maintaining previously mentioned advantages.

FIG. 10 shows an exploded view of the reaction chamber 301 while FIG. 11 shows a cross-sectional view of the assembled reaction chamber 301. The reaction chamber 301 can comprises an upper retainer ring 310, a cover 320, an upper generant cup 330, a generant packet 340, an initiator 360, a bore body seal 370, and a lower retainer ring 380. Each of these components will be described, in turn, below.

The upper retainer ring 310 includes a flat surface 311, an inner rim 312, an outer rim 313, and a plurality of bolt holes 314. The upper retainer ring 310 also has a curved portion 315, which is situated between the flat surface 311 and the inner rim 312. The inner rim 312 has a series of circular cut outs 316 which correspond to the opening of holes 325 in the cover 320. These cut outs 316 prevent the obstruction of the gas flow from the exit ports 325 of the cover 320 to the inflatable curtain. The flat surface 311, the inner rim 312, and the curved portion 315 are shaped such that they can mate with an external surface of the cover 320, as described below. As in the other embodiments, the upper retainer ring 310 can be any suitable material, such as stamped steel or other metal.

The bolt holes 314 are in the same configuration as the holes in the cover 320, the upper generant cup 330, and the lower retainer ring 380. Bolts 302 are fed through the holes 314, the holes in the cover 320, the holes in the upper generant cup 330 and the holes in the lower retainer ring 380. The bolts 302 are screwed into nuts 303 such that the entire assembly is one compact modular unit. In addition, there can be sealing washers 305 which are used to prevent the inflating gas from leaking through the bolt holts 314. The sealing washers can be inserted into the bolt so that the heads of the bolts 302 are flush with the top surface 328 of the flange 321, as seen in FIG. 11. Alternatively, there can be two sets of sealing washers in which one set is sandwiched between the heads of the bolts 302 and the top surface of the flange 321 and another set is sandwiched between the nuts 303 and the bottom surface of the lower retainer ring 380.

The cover 320 includes a flange 321 and a pocket 322. The flange 321 has a plurality of bolt holes 323 which correspond to the holes 314 in the upper retainer ring 310, a bottom surface 327, and a top surface 328. The pocket 322 is shaped such that the upper generant cup 330 and the generant packet 340 can fit inside thereof. For example, FIG. 10 shows the pocket 322 to be dome-shaped but any suitable shape can be used, such as the half-cylindrical shape seen in FIG. 2(b).

The cover 320 has a groove 326 on the bottom surface 327 on the flange 321 which mates with a rim 385 on the outer periphery of the lower retainer ring 380 and a rim 339 of the upper generant cup 330. This connection of the rims 385 and 339 with the groove 326 aids in sealing the gas so that it does not leak out between the retainer ring 380 and the upper generant cup 330 and between the upper generant cup 330 and the cover 320.

As seen in FIG. 12, the pocket 322 can have flow orifices 324 for the flow of gas from the upper generant cup 330 toward the inflatable cushion. These flow orifices 324 begin at the top of the pocket 322 on its internal surface and extend down the internal surface of the pocket 322 and terminate at the location where the pocket 322 and the flange 321 meet. Generally, these flow orifices 324 can be dimples in the inner surface of the pocket 322. Holes 325 extend from these dimple-shaped orifices 324 to the outer surface of the pocket 321. These holes allow inflation fluid to be in fluid communication with the inflatable cushion, which would have an opening for the inflation fluid immediately adjacent to the holes.

As with the other embodiments, the cover 320 can be made from any suitable metal, injection molded material, or die cast material, such as magnesium or aluminum, however, the material should be chosen such that the material of the cover 320 itself is not subject to becoming fuel in the gas generating process. For example, it may be desirable to use a ceramic coating over the cover 20 if the cover is made from magnesium.

The upper generant cup 330 and the lower retainer ring 380 make up a gas generant container 400 which contains a solid propellant material used to expand the inflatable cushion. The gas generant container 400 fits inside the pocket 322 of the cover 320. The upper generant cup 330 can be made from stamped steel.

As to the upper generant cup 330, it has an external surface 31 with an opening 332 and a flange 333. The external surface 331 is shaped such that the upper cup can fit inside the pocket 322 of the cover 320. For example, FIG. 10 shows the external surface 331 being dome-shaped but any suitable shape can be used. In addition, the upper generant cup 330 has a first set of holes 334 located on the external surface 331 as depicted in FIG. 11. The holes 334 can either be open or closed by either plastic or thin metallic foil seals to provide some environmental sealing to protect the propellant. The flange 333 of the upper generant cup 330 includes a plurality of holes 338 in which bolts 302 are fed. The contour of the lower surface of the flange 333 is configured such that it fits inside the rim 385 of the lower retaining ring 380. As previously mentioned, the upper generant cup 330 also includes a rim 329 on its outer periphery for insertion into the groove 326 of the flange 321 so as to seal potential gas leaks.

Inside the gas generating container 400 is a generant material in the form of propellant granules. The generant material is retained because the upper generant cup 330 and the lower retaining ring 380 are bolted together in the final assembly. The geometric form and size of the propellant granules can be tailored for the desired rate of gas production.

In another embodiment, instead of the generant material being retained inside the upper and lower generant cups, the gas generate can be pre-packaged into a hermetically sealed bag. This bag with generant material shown as the generant packet 340 in FIG. 10. As with the previous embodiment, the upper generant cup 330 and the lower retaining ring 380 are bolted together so as to retain the generant packet 340. The geometric form and size of the propellant granules can be tailored for the desired rate of gas production. The generate packet 340 can be vacuum packed and formed into a specific shape. For example, FIGS. 10 and 11 show that generate packet has an upper dome shape surface 341 that corresponds with the interior of the upper generant cup 330, a lower flat surface 342, and an aperture 343 that corresponds to the shape of the initiator 360 that protrudes into the gas generant container 400 through the aperture 354 in the lower retaining ring 380.

The initiator 360 is a commonly available airbag squib containing a quantity of between 35 and 225 mg of a pyrotechnic compound, typically of zirconium potassium perchlorate (ZPP) or titanium potassium perchlorate (TPP) although other compounds such as nitrocellulose and lead styphanate could also be used. The initiator 360 is set inside the body bore seal 370 in which the initiator's active end protrudes into the gas generate container and is in close communication with the gas generating material or the generant packet 340.

The body bore seal 370 is holds the initiator 360 by a cap 390 (as seen in FIG. 11). The body bore seal 370 can be cylindrical in shape but any suitable shape can be used. The body bore seal 370 comprises a large circumferential surface 371, a flange 372 at a point along the large circumferential surface, a tapered portion 373, a smaller circumferential surface 374, and an aperture 375. The large circumferential surface is sized such that it fits in the aperture 381 of the lower retainer ring 380. The flange 372 is sized such that it is captured between the gas generant packet 340 and the upper surface 382 of the lower retainer ring 380. The aperture 375 is bored through the longitudinal direction of the body bore seal 370 and has a taped ledge 376 inside to seat the initiator 360. The body bore seal can be any suitable metal such as stainless steel or other metal.

The cap 390 has an aperture that matches the outer contours of the body bore seal 370. The front section of the initiator 360 protrudes through a hole 391 that penetrates the surface 392 of the cap. The cap 390 and body bore seal can be attached to each other by any known means in the art, such as set screws or having female threads on the cap 390 which mate with male threads on the body bore seal 370.

The lower retainer ring 380 is positioned over the open end of the pocket 322 of the cover 320 such that the upper generant cup 330, the generant packet 340, the initiator 360, and the body bore seal 370 are encased between the pocket 320 and the lower retainer ring 380. The retainer ring 380 has an aperture 381, an upper surface 382, a lower surface 383, and a plurality of bolt holes 384. The upper and lower surfaces of the retainer ring 380 are contoured such that the flange 372 of the body bore seal 370 and the flat surface 342 of the generant packet 340 sits flat upon it. As previously mentioned, the lower retainer ring 380 also includes a rim 385 which inserts into a groove 326 of flange 321 for sealing a potential gas leaks. The lower retainer ring 380 can be made from any suitable material, such as stamped steel or other metal. The lower retainer ring is secured to the cover 322 by any known fastening device or devices, such as the bolt holes 384, a twist-lock joint, or a combination of both.

Referring to the assembled reaction chamber in FIG. 11, the function of the gas generating feature will now be explained. Upon an indication of a crash event from a vehicle's sensors, an electrical signal travels through wires 361 to the igniter 360 in a traditional manner. In response to the ignition signal, the small explosive charge included within the squib ignites which in turn ignites the propellant in the gas generant container 100, i.e., the upper generant cup and the lower retainer ring, by penetrating the hermetically sealed bag of the gas generant packet 340. The pressure of the burning propellant is controlled by the sizes of the holes 334 in the upper generant cup 340. Generated gas flows out of the holes 334 of the upper generant cup 340, through the flow orifices 324 in the cover 320, and out the holes 325 into the folded inflatable cushion. The rest of the inflation process is traditional.

Manufacturing of the airbag module according to the various embodiments has some unique elements. While the cover, the inflatable cushion, and the retainer ring are assembled in a traditional way, the way the generant container and igniter are defined, handled and installed is unique. In particular, the generant container 100 is designed to have a sufficient orifice area that even if it is environmentally sealed with plastic or foil covers, the gas generant cannot develop enough pressure to burn efficiently and generate gas. Also, when outside of the enclosed pocket, if the propellant were exposed to sufficient heat, it would either become inert or smolder but would not develop enough pressure to burn vigorously.

Embodiments of the disclosed airbag module allows for a consolidation of formerly discrete parts for significant reduction in size, mass, and cost, while providing improved packaging flexibility and maintaining performance. In addition, the airbag module design simplifies the manufacturing process for the airbag module and gas generating source by eliminating assembly steps and reducing parts. Furthermore, manufacturing logistics are improved by simplifying the shipment of the gas generation compound and by reducing the required shipping and handling regulatory compliance requirements by substituting benign subcomponents for the more energetic assemblies.

Furthermore, by having some control of the gas pressure and speed at the exit orifice, the disclosed airbag module has an additional set of controls that can be utilized by the airbag module engineer during the performance optimization process. Currently, if a new pressure curve is desired, the generant formulation must be changed or physical changes must be made to the inflator. This requires a new inflator validation and generates inflator version proliferation. When the number of inflators increases, generally there is a loss in profitability due to the loss of savings of scale. The disclosed airbag module allows optimization of its pressure curve (within reasonable limits) without making generant formulation changes by altering the flow orifices of the airbag module. This should greatly reduce version proliferation and increase the savings that can be garnered from high volume production of propellant packs.

Thus, embodiments of the disclosed design allow for a smaller, lower cost airbag module with fewer parts, simplified assembly and streamlined logistics. The airbag module can be fully assembled prior to the time that the gas generant package is installed with the igniter. This allows the module to be fully assembled in a low cost facility near the location of the customer, with the gas generating function of the assembly being non-functional until the last step in the manufacturing process, at the time immediately prior to the time that it would be shipped to the customer.

In addition, during the normal production of conventional inflators, if a failure is found with the sealing of the inflator or with the electrical test of the igniter, the entire inflator must be scrapped. With the disclosed designs of the present application, if there is a sealing failure during the packet sealing process, the packet material is scrapped but the propellant can be saved. Additionally, if there is an electrical failure at the EOL tester for the airbag, the lower retainer ring, the body bore seal, and the initiator can be removed and replaced without the need to scrap the propellant pack or the rest of the airbag module.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
   a cover with a flange and a pocket;
   an upper retainer ring with at least one hole;
   a gas generant container including gas generant propellant, at least a portion of the gas generant container being positioned within the pocket;
   a lower retainer ring positioned below the cover; and
   an inflatable cushion,
   wherein the gas generant propellant becomes functional as a gas generation source after the cover is secured to the lower retainer ring,
   wherein the cover is positioned between the upper retainer ring and the gas generant container, the cover including at least one exit hole in the flange in alignment with the at least one hole of the upper retainer ring, and wherein gas generated by the gas generant propellant flows through flow orifices in the cover and out the at least one exit hole into the inflatable cushion to inflate the cushion.

2. The airbag module of claim 1, wherein the gas generant container includes an upper cup attached to a lower cup such that the gas generant propellant is positioned in a space formed by the upper and lower cups.

3. The airbag module of claim 2, wherein the upper cup is configured to be positioned inside and directly adjacent the pocket of the cover.

4. The airbag module of claim 1, further comprising an initiator and a bore body seal, wherein the initiator is positioned within the bore body seal.

5. The airbag module of claim 4, wherein the initiator and bore body seal extend from the lower retainer ring and into a hole in the gas generant container.

6. The airbag module of claim 1, wherein the gas generant container includes two sets of holes, the first set of holes positioned to face the pocket such that gas generated by the gas generant propellant flows into the pocket via orifices to inflate the cushion, and the second set of holes includes at least one hole remote from the first set of holes and positioned to receive an initiator configured to ignite the gas generant propellant.

7. The airbag module of claim 6, wherein orifices in the cover facing the first set of holes are dimple shaped orifices.

8. The airbag module of claim 7, wherein each dimple shaped orifice includes a cover plate.

9. The airbag module of claim 8, wherein the cover includes a centrifugal collector channel.

10. The airbag module of claim 7, wherein the dimple shaped orifices are configured to guide the generated gas along an internal surface of the cover via flow orifices.

11. The airbag module of claim 10, wherein the flow orifices are configured such that a flow path of the generated gas includes first and second volumes of high pressure connected by a volume with supersonic gas flow.

12. The airbag module of claim 11, wherein the first volume is located adjacent the first set of holes in the gas generant container.

13. The airbag module of claim 11, wherein the second volume is located downstream from the first volume and includes the volume of gas next to the at least one exit hole in the cover.

14. The airbag module of claim 1, wherein the gas generant propellant is contained within a hermetically sealed package.

15. An airbag module, comprising:
a cover with a flange and a pocket;
an upper retainer ring with at least one hole;
a gas generant container including gas generant propellant, at least a portion of the gas generant container being positioned within the pocket;
a lower retainer ring positioned below the cover; and
an inflatable cushion;
wherein the gas generant propellant becomes functional as a gas generation source after the cover is secured to the lower retainer ring, and
wherein the gas generant container includes an upper cup attached to a lower cup such that the gas generant propellant is positioned in a space formed by the upper and lower cups;
wherein the upper cup is crimped closed to the lower cup,
wherein the cover is positioned between the upper retainer ring and the gas generant container, the cover including at least one exit hole in the flange in alignment with the at least one hole of the upper retainer ring, and
wherein gas generated by the gas generant propellant flows through flow orifices in the cover and out the at least one exit hole into the inflatable cushion to inflate the cushion.

16. A method of assembling an airbag module, comprising:
providing a cover with a flange and a pocket;
providing a gas generant container with a gas generant propellant;
providing an upper retainer ring and a lower retainer ring;
attaching an inflatable cushion to the upper or lower retainer ring;
positioning the gas generant container within the pocket of the cover; and
attaching the cover to the lower retainer ring, whereby the gas generant propellant becomes functional as a gas generation source only after the cover is attached to the lower retainer ring,
wherein the cover is positioned between the upper retainer ring and the gas generant container, the cover including at least one exit hole in the flange in alignment with at least one hole of the upper retainer ring, and
wherein gas generated by the gas generant propellant flows through flow orifices in the cover and out the at least one exit hole into the inflatable cushion to inflate the cushion.

17. The method of claim 16, further comprising:
inserting an initiator into an aperture of the gas generant container.

18. The method of claim 17, wherein the initiator is positioned in a bore body seal.

19. The method of claim 18, wherein the initiator and bore body seal extend from an aperture in the lower retainer ring.

20. The method of claim 16, further comprising:
pre-packaging the gas generant propellant in a hermetically sealed package prior to positioning the gas generant propellant in the gas generant container.

* * * * *